May 3, 1960 F. P. BARTH 2,935,005
INTRA-LENS SHUTTER WITH DELAYED ACTION DEVICE
Filed Aug. 17, 1956 6 Sheets-Sheet 1

INVENTOR.
Fritz P. Barth
BY
Munn, Liddy, Nathanson & March
ATTORNEYS

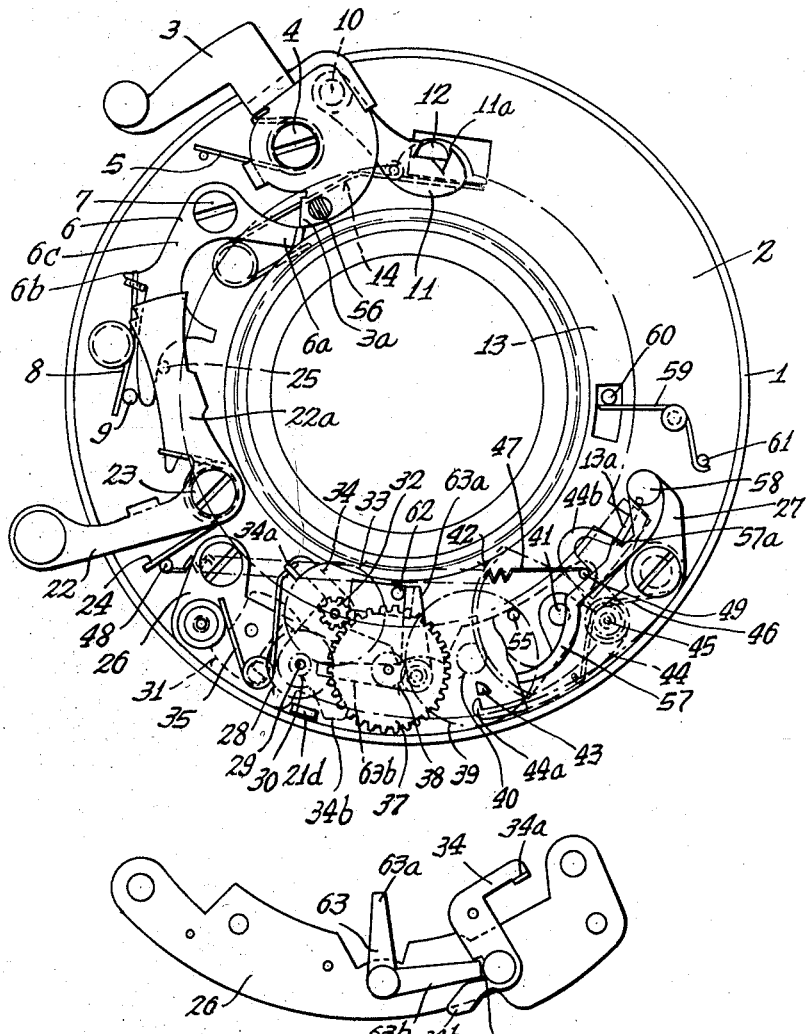

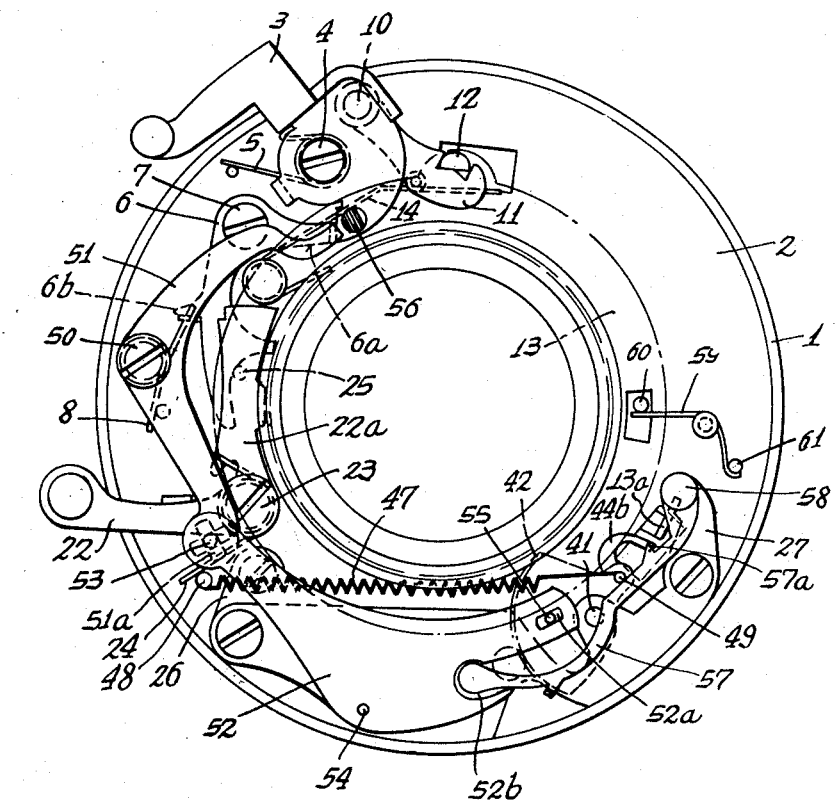

May 3, 1960           F. P. BARTH           2,935,005
INTRA-LENS SHUTTER WITH DELAYED ACTION DEVICE
Filed Aug. 17, 1956           6 Sheets-Sheet 4

INVENTOR.
Fritz P. Barth
BY
Munn, Liddy, Nathanson & March
ATTORNEYS

May 3, 1960 F. P. BARTH 2,935,005
INTRA-LENS SHUTTER WITH DELAYED ACTION DEVICE
Filed Aug. 17, 1956 6 Sheets-Sheet 5
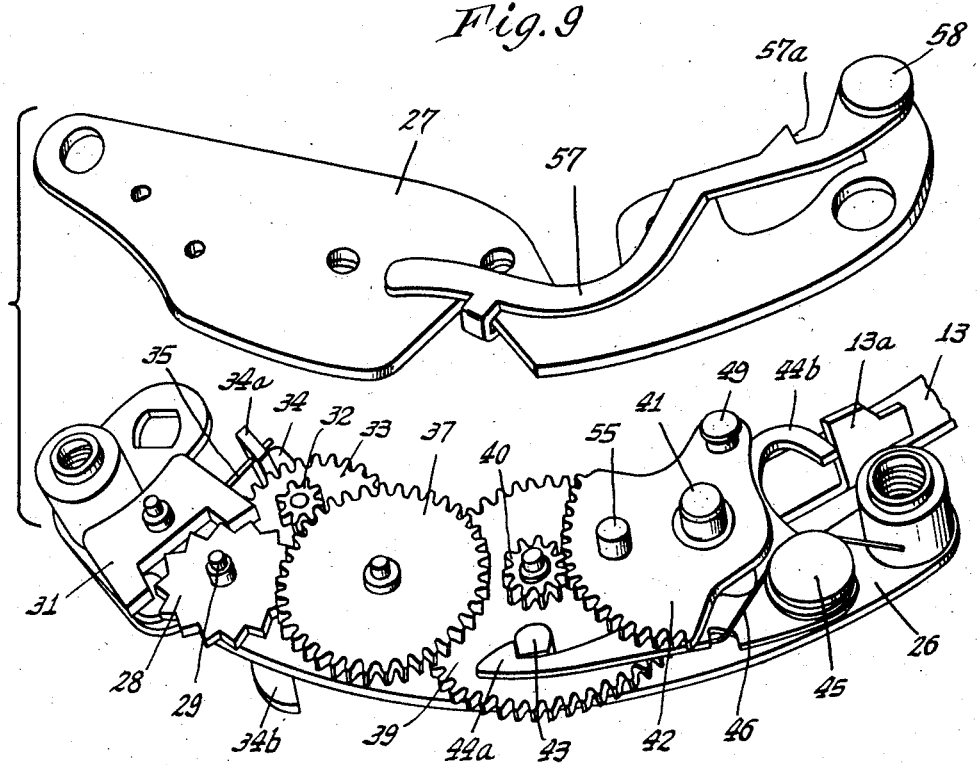
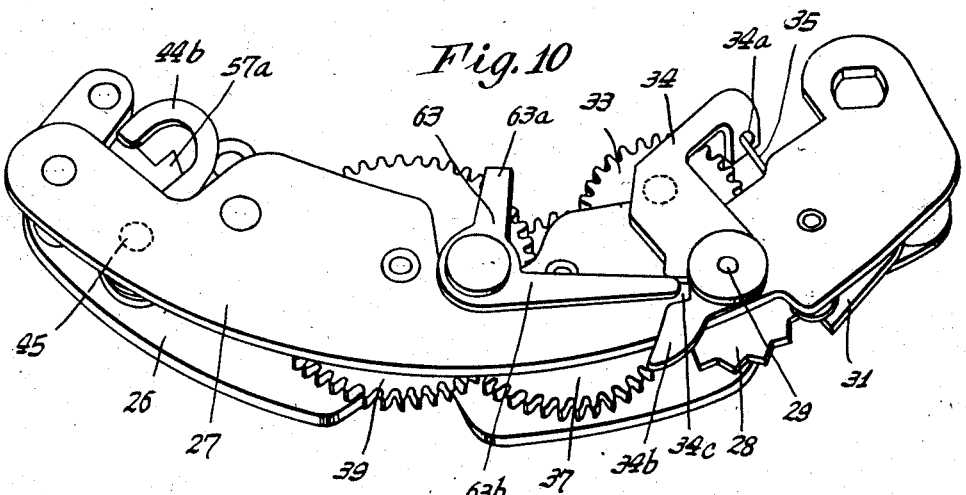
INVENTOR.
Fritz Barth
BY
Munn, Liddy, Daniels & March
ATTORNEYS

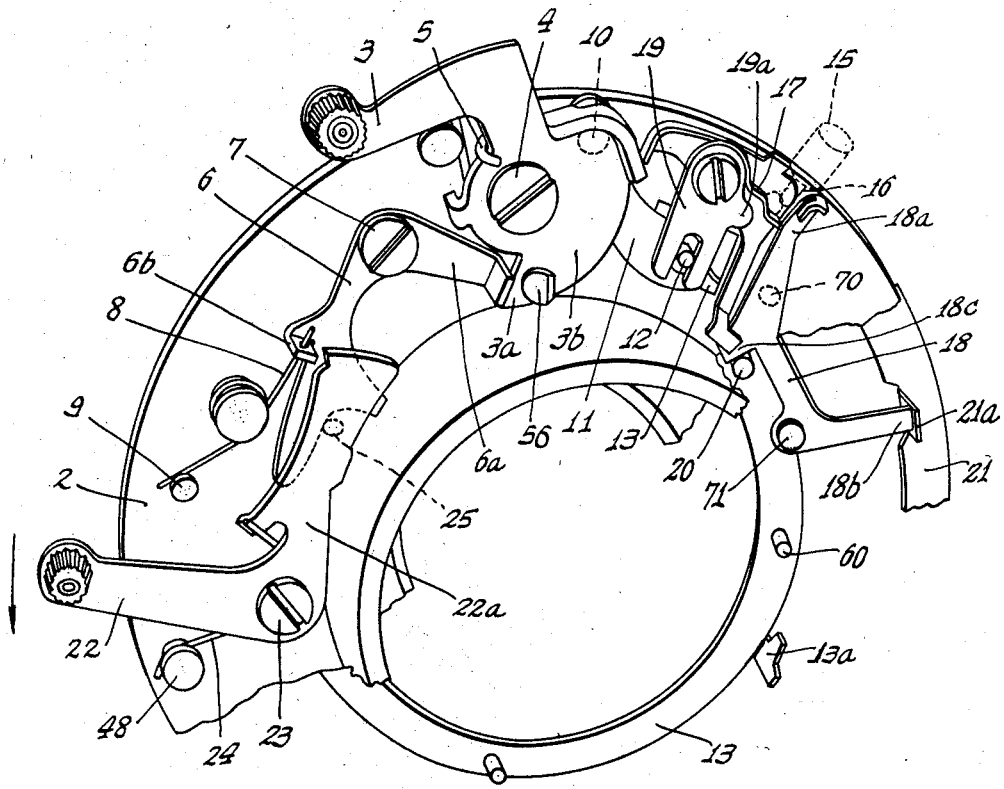

United States Patent Office 2,935,005
Patented May 3, 1960

2,935,005

INTRA-LENS SHUTTER WITH DELAYED ACTION DEVICE

Fritz P. Barth, Calmbach (Enz), Germany, assignor to Alfred Gauthier G.m.b.H., Calmbach (Enz), Germany, a corporation of Germany Application August 17, 1956, Serial No. 604,774

Claims priority, application Germany August 18, 1955

5 Claims. (Cl. 95—53.6)

This invention relates to photographic intra-lens shutters, and more particularly to shutters of this type which are equipped with delayed action devices comprising two distinct groups adapted to be coupled to and uncoupled from each other.

Delayed action devices of this type commonly comprise a motivating means by which the device is run down, and also a means for cocking or energizing said motivating means.

An object of the present invention is to provide a novel and improved intra-lens shutter with delayed action device adapted to be cocked, wherein the cocking of the delayed action device may be effected by the expenditure of a relatively small amount of force or power.

In accomplishing this, in accordance with the invention, I provide a novel spring-biased holding device in the shutter, which functions to normally hold disengaged the two groups of the delayed action device during the rest positions of the shutter. Such disengagement is terminated by the releasing of the shutter for the purpose of making an exposure, or in response to actuation of a member which is either directly or indirectly operated upon release of the shutter. With such termination there is immediately effected a coupling to each other of the two groups of the delayed action device. Also, I provide in accordance with the invention a member actuated by the shutter blade ring of the blade driving mechanism, said member being operable to uncouple again the two groups of the delayed action device at the earliest upon completion of the effective running down movement of the delayed action device which accomplishes the delayed opening of the shutter, and at the latest prior to halting of the shutter blade ring after it has completed the reclosing of the shutter blades. Such uncoupling of the groups is secured or maintained by the said spring-biased holding device mentioned above.

Where the intra-lens shutter has a delayed action device which is releasable in response to movement of a member connected with the shutter blade driving mechanism, I have found it possible in a simple manner to employ said member for effecting the uncoupling of the two groups of the delayed action device against the action of a spring means which then normally tends to maintain the said groups coupled to each other. In carrying this out, a pin may be conveniently arranged on the shutter blade ring, and a lever may be provided, responsive to movement of the pin and also acted on by the spring, said lever being carried by a bearing plate of the delayed action device and mounting a gear constituting part of one of the groups of said device.

I further employ, in connection with the said pin and lever, an intermediary member or transmission, comprising a second lever, thereby to obtain a simple and advantageous yet extremely reliable coupling and uncoupling of the said two groups in response to relatively small movement of the shutter blade ring after it has completed the opening and reclosing of the shutter blades. Such additional lever may be advantageously arranged on the same bearing plate of the delayed action device as the first-mentioned lever, thereby enabling it to be included therewith so as to constitute a single unit, which is of advantage in connection with the mounting of the shutter.

Other features and advantages will hereinafter appear.

In the drawings accompanying this specification, similar characters of reference indicate corresponding parts wherever possible in the several views, in which:

Figure 1 is a front view of an intra-lens shutter with the front housing plate removed, revealing the delayed action device having the two groups adapted to be coupled and uncoupled, and revealing in part means by which the delayed action device may be cocked simultaneously with the shutter. Portions of such simultaneous cocking means have been omitted from Fig. 1, being shown in a succeeding figure. In Fig. 1 the shutter is in cocked position and the two groups of the delayed action device are maintained uncoupled by means provided by the invention. There is also shown in this figure the flash contact mechanism.

Fig. 2 shows the same shutter as Fig. 1, with certain parts omitted for the sake of clarity. In Fig. 2 the parts are shown immediately after actuation of the shutter release, with the two groups of the delayed action device coupled to each other, said delayed action device being released for its running down movement.

Fig. 3 is a rear view of the rear bearing plate of the delayed action device, the parts carried thereby being arranged in the same positions that they occupy in Fig. 1.

Fig. 4 is a view like Fig. 1, but with the flash contact mechanism and delayed action device omitted. Instead, the coupling means is illustrated, by which there is effected cocking of the delayed action device simultaneously with cocking of the shutter driving mechanism.

Fig. 9 is an enlarged perspective view of the delayed action device shown in Fig. 4. The upper bearing plate of the delayed action device is shown as removed, and the device is in its cocked position.

Fig. 10 is an enlarged perspective view of the delayed action device, showing the rear of said device, as also seen in Fig. 3.

Fig. 11 is an enlarged fragmentary perspective view of the cocking, releasing and driving mechanism for the shutter, which is also shown in Fig. 1, such mechanism being illustrated in its cocked position.

Figure 1:
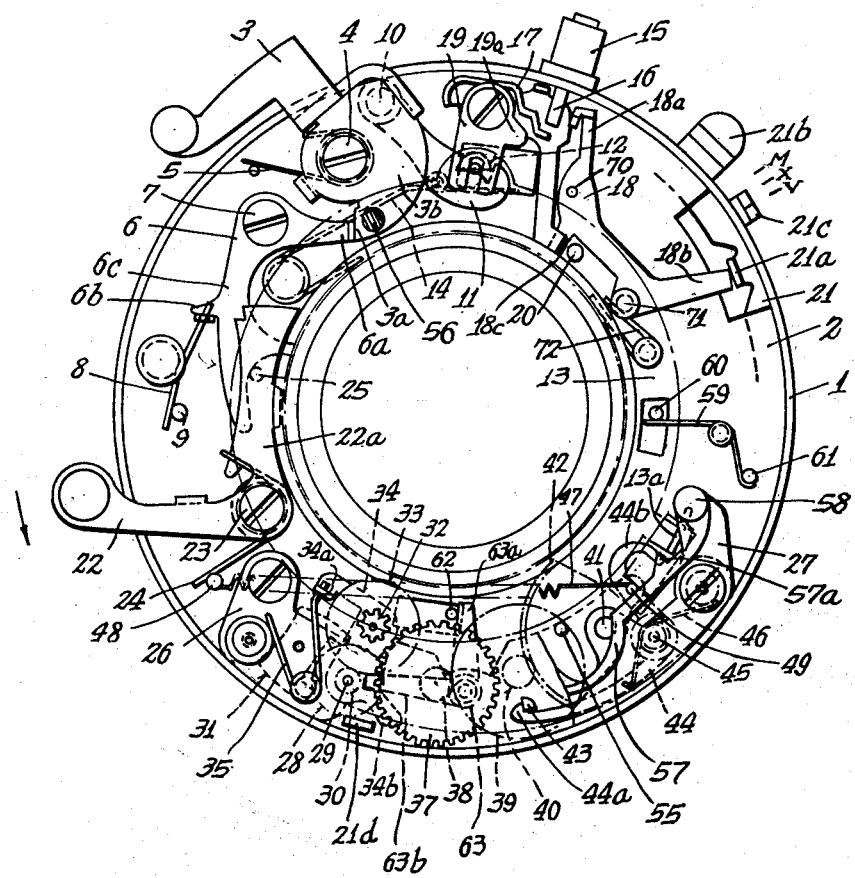
Figure 5:
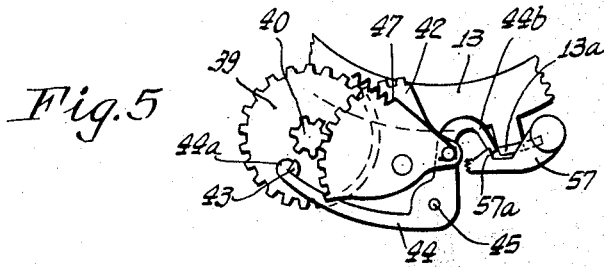
Fig. 5 is a fragmentary view of the structure shown in Fig. 4 but with a bearing plate removed; also, the portion of the delayed-action device which is illustrated is occupying the cocked position, as in Fig. 1.
Figure 6:
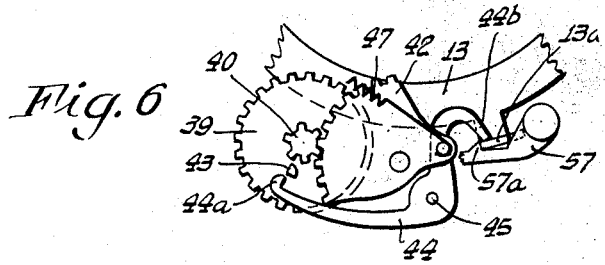
Fig. 6 is a view like Fig. 5, but showing the portion of the delayed-action device at the moment it is set free.
Figure 7:
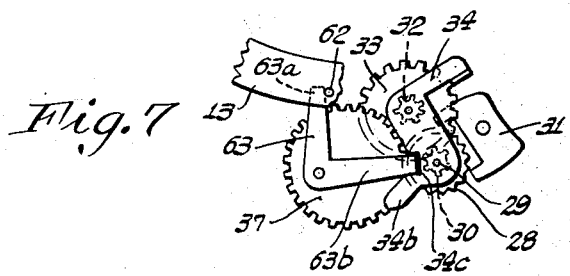
Fig. 7 is a view along the lines of Fig. 3, showing the coupling parts of the delayed-action device as being disengaged.
Figure 8:
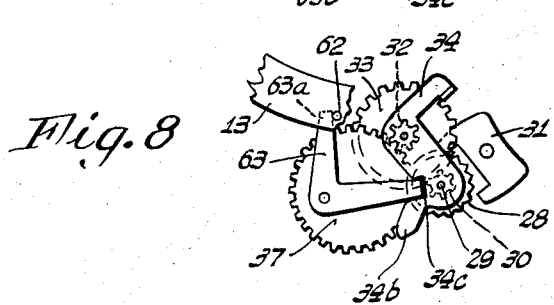
Fig. 8 is a view like Fig. 7 but showing the coupling parts of the delayed-action device as in engaged position.

As shown, the improved intra-lens shutter with delayed action device of the present invention comprises a housing 1 having a base plate 2 on which there is mounted a cocking lever 3 carried by a pivot 4. The lever 3 is normally urged clockwise by a driving spring 5, and has a nose 3a engageable with the short arm 6a of a two-armed arresting lever 6 carried by a pivot 7. The arresting lever 6 has a long arm 6c provided with a lug 6d engaged by a spring 8, which latter is anchored against a pin 9 fixedly carried by the base plate 2. The lever 6 is thus normally urged counterclockwise.

The cocking lever 3 has a bolt 10 on which there is pivotally mounted a latch 11 having a mouth 11a embracing a pin 12 carried by the shutter blade ring 13. The latch 11 is under the influence of a spring 14 as shown. It will be understood that the shutter blade ring 13 is connected in the well-known manner to actuate the usual shutter blades, and such structure is not shown herein for purposes of clarity and since it forms no part per se of the present invention.

In order to control a flash device, the housing 1 is provided with a contact nipple 15 having a contact pin 16 insulated therefrom and cooperable in a well-known manner with a contact spring 17 and contact lever 18. For the purpose of actuating the contact spring 17, by which the ignition circuit is closed at the instant of complete opening of the shutter, there is provided a lever 19 engaged with the pin 12 of the shutter blade ring 13. The contact lever 18 is freed for actuating by a pin 20 on the blade ring, after a small initial movement of the latter. However, actual movement of the lever 18 is dependent on shifting of an arresting arm 21a of a ring 21 rotatably carried by the housing 1. Such shifting is effected by actuation of a handle 21b connected with the ring, and the latter has a pointer 21c which is adjustable to the marks "M," "X" and "V" arranged at the periphery of the housing. As shown in Fig. 1 the lever 18 is held captive by the arresting arm 21a, corresponding to the position "V" of the ring 21. In the same manner the lever 18 is arrested also in the position "X" of the ring 21, whereas when the ring is shifted to the position "M," the lever 18 is freed for contact-effecting movement upon clockwise movement of the shutter blade ring 13.

Considering the lever 19 as shown in Figs. 1 and 11, there is provided a camming nose 19a arranged to engage the contact spring 17 so as to cause the latter to engage the contact pin 16 at the time that the shutter has reached its fully-open position. The lever 19 is actuated by means of a pin 12 fixedly carried by the shutter blade ring 13, said pin being received in the bifurcated end of the lever 19 and being also engaged by the latch or link 11, in the mouth 11a thereof. The latch or link 11 constitutes a driving connection between the driving disk portion 3b of the cocking and driving lever 3 and the shutter blade ring 13. It will be understood that the shutter blade ring 13, in actuating the shutter blades, first moves clockwise an extent as viewed in Fig. 11 and then reverses its movement and turns in a counterclockwise direction in response to the driving forces imparted to it by the link 11 and the cocking and driving lever 3, 3b. At the time that the shutter blade ring 13 has finished its clockwise turning, the shutter blades will be fully open, and for such position the lever 19 will obviously have been pivotally moved counterclockwise the maximum extent, whereby the spring 17 actuated by the said lever will be in engagement with the contact pin 16 for effecting the flash exposure.

It will be seen that each time the shutter blades are actuated the lever 19 will be swung counterclockwise to effect a closing of the flash circuit by the spring 17, for the settings "X" and "M" of the setting ring 21. However, this is of no consequence for position "M" wherein the lever 18 is to be made operative, since prior to the contact being effected between the spring 17 and the pin 16 a contact has already been established between the lever arm 18a and the pin 16. Of course, for the setting "X" the lever 18 is rendered inoperative, and the only contact is that established by the spring 17 engaging the pin 16.

For the purpose of releasing the shutter for making an exposure, there is provided a two-armed release lever 22 carried by a pivot 23 fixed to the base plate 2, said lever being normally urged clockwise by a spring 24. The lever 22 has an arm 22a carrying a pin 25 adapted to engage the long arm 6c of the lever 6 for driving the latter clockwise to release the shutter.

The delayed action device is shown in the lower portion of Fig. 1 and comprises a pair of separate gear trains, one of which is coupled to an escapement, said trains constituting the groups adapted to be coupled and uncoupled. This delayed action device has a rear bearing plate 26 and a front bearing plate 27, the latter being only partially drawn for the sake of clarity.

One group of the delayed action device comprises an anchor wheel 28 carried by a spindle 29, said wheel being connected with a pinion 30 and also being engageable with an oscillatable anchor member 31. The pinion 30 meshes with a gear 33 connected to a pinion 32, the gear 33 being carried by an arm 34a of a lever 34 which pivots about the axis of the anchor wheel 28. Thus the gear 33 and pinion 30 are always in mesh.

The lever 34 has a second arm 34b adapted to be engaged by an arm or lug 21d fixedly carried by the ring 21. A spring 35 engaging the arm 34a of the lever 34 normally urges the latter in a clockwise direction. By means of the lug 21d the lever 34 may be shifted in a counterclockwise direction against the action of the spring 35 when the ring 21 is moved from position "V" to settings "X" or "M." Thus in the positions "X" and "M" of the ring 21, the lever 34 will have a counterclockwise rotated position by which, as will be shortly described, the two groups of the delayed action device are uncoupled.

The other group of the delayed action device comprises a gear 37 adapted to mesh with the pinion 32 when the lever 34 is shifted clockwise from the position shown in Fig. 1, to the position shown in Fig. 2. Attached to the gear 37 is a pinion 38 meshing with a gear 39 which has affixed to it a pinion 40, the latter being driven by a toothed segment 42 pivoting about a spindle 41. The gear 39 has a locking pin 43 of semi-circular cross section, said pin being adapted to engage a locking hook 44a of a two-armed notched lever 44. Such engagement occurs during the cocked position of the shutter. The lever 44 is carried on a pivot 45, and has a curved arm 44b engageable with a trip arm or trip lug 13a which is carried by the shutter blade ring 13. As shown, the arm 44b of the lever is bent into a semi-circular shape, and said lever is under the influence of a spring 46 which tends to rotate the lever clockwise.

The delayed action device further comprises a driving spring 47 connected at one end to a fixed pin 48 and at the other end to a pin 49 carried by the toothed segment 42, Figs. 1 and 4. Considering the latter figure, the cocking lever 3 may be operably related to a two-armed transmission lever 51 carried on the base plate 2 by means of a pivot 50. The lever 51 is connected with a second two-armed transmission lever 52 by means of a rivet 53 fixed to the latter, said rivet extending through a slot 51a in the lever 51. The lever 52 is shiftable about a pivot 54 carried on the bearing plate 27, and has in one of its arms a slot 52a through which a pin 55 passes, said pin being fixed on the toothed segment 42. When cocking the shutter, the lever 51 is actuated in a well-known manner by a sloped pin 56 affixed to the cocking lever 3.

By virtue of the interaction between the parts 42, 55, 52, 51, 56 and 3, there is reliably effected a simultaneous cocking of the delayed action device and also the camera shutter.

On the front bearing plate 27 of the delayed action device there is pivotally mounted a one-armed lever 57, carried by a pivot 58. The end of the lever 57 is guided in a slot 52b of the lever 52, and during the running down movement of the delayed action device the nose 57a of the lever 57 engages the trip member 13a of the blade ring 13 and serves as an effective stop for the blade ring. Such engagement occurs after release of the cocking lever 3 which drives the blade ring.

Release of the trip lug 13a, or disengagement of said lug from the nose 57a is effected by virtue of clockwise movement of the lever 52, such movement occurring during the running down of the delayed action device and in consequence of the driving connection between the pin 55 thereof and the lever 52.

I provide a spring 59, Fig. 4, on the base plate 2, for engagement with a pin 60 on the shutter blade ring 13, said spring being backed up by a stationary pin 61 and yieldably holding the shutter blade ring 13 in a counterclockwise or rest position during the cocking of the shutter.

In the embodiment of the invention illustrated herein there is provided a pin 62 fixed to the shutter blade ring 13, said pin being for the purpose of maintaining uncoupled the two groups of the delayed action device during the rest position of the shutter. The pin 62 is engageable with an arm 63a of a two-armed lever 63, said lever having a second arm 63b extending into a recess 34c of the lever 34, see Fig. 3. In the rest position of the shutter, the lever 63 is held by the pin 62 in a clockwise shifted position, by which the lever 34 is held in a counterclockwise shifted position maintaining uncoupled the two groups of the delayed action device, all as pictured in Fig. 1.

I have found that I may utilize a relatively small movement of the shutter blade ring 13 to effect such coupling and uncoupling, through the provision of the transmission lever 63, and that with such lever there is had a very reliable actuation of the lever 34 to couple or uncouple the two groups of the delayed action device. A movement of as little as 0.3 mm. of the shutter blade ring 13 from its initial or rest position, representing that required for the trip lug 13a to strike the nose 57a of the lever 57, has been found sufficient to reliably effect the coupling together of the two groups of the delayed action device. The lever 63 is supported at the rear surface of the rear bearing plate 26 of the delayed action device, as shown in Fig. 3. The disposition of the lever 63 in this location is advantageous in effecting a saving of space and ease of assembly and facilitates a simple connection between the two levers 63 and 34.

The operation of the improved shutter and delayed action device of this invention is as follows: When the setting ring 21 is set to either the "M" or "X" position, the lever 34 will be maintained at all times in the counterclockwise position shown in Fig. 1 by virtue of engagement of the arm 21d of the ring with the arm 34b of the lever, and accordingly for such positions there is not possible any functioning of the delayed action device. With the setting ring 21 in the "V" position, the two groups of the delayed action device normally will be uncoupled as illustrated in Fig. 1. Cocking of the shutter is effected in the normal manner, by actuation of the cocking lever 3, and such cocking will not require a great deal of additional effort or power due to the delayed action device being also cocked, inasmuch as the escapement group of the delayed action device including the pinion 32, is uncoupled from the driving group of the delayed action device including the gear 37. It will be readily appreciated that by virtue of such uncoupling there is only a small gear drag resistance with the delayed action device, and thus the force required for cocking the same simultaneously with cocking of the shutter drive mechanism may be comparatively small. Such small cocking force is especially important where both the shutter and the delayed action devices are cocked simultaneously, as illustrated herein.

The cocked position of the shutter driving mechanism is shown in Fig. 1. To release the shutter, the release lever 22 is moved downward or in the direction of the arrow. This unlocks the cocking lever 3 by virtue of disengagement thereof by the arresting lever 6, and the cocking lever will thereafter under the urging of the spring 5 start to drive the shutter blade ring 13 clockwise, due to the connection through the latch 11.

After the blade ring 13 has initially moved a short distance, the trip lug 13a thereof will strike the semi-circle shaped part 44b of the lever 44, shifting this lever counterclockwise and thereby releasing the delayed action device by virtue of disengagement of the locking hook 44a from the pin 43. Prior to this occurring, however, the lever 63 is released for counterclockwise movement by virtue of the right to left movement of the pin 62, as viewed in Figs. 1 and 2, and thus the lever 34 influenced by the spring 35 is shifted clockwise, causing the pinion 32 to engage the gear 37 and coupling together the two groups of the delayed action device. This coupling therefore is effected before the release of the delayed action device occurs by disengagement of the hook 44a from the pin 43. Subsequently, the trip lug 13a of the shutter blade ring 13 strikes the nose 57a of the lever 57 and is prevented thereby from moving any further. Thus the shutter blade ring 13 is halted, and the shutter blades are still held closed. The delayed action device now runs down, causing clockwise movement of the lever 52 and counterclockwise movement of the lever 57. This eventually causes the nose 57a of the lever 57 to release the trip lug 13a of the shutter blade ring 13, whereupon the latter completes its shutter opening and shutter closing movement. At the termination of the reverse or shutter closing movement of the blade ring 13, the pin 62 of the blade ring will strike the arm 63a of the lever 63 and shift the latter clockwise, thereby again uncoupling the two groups of the delayed action device.

The reversing movements of the shutter blade ring 31 in effecting opening and closing of the shutter blades are produced by virtue of the disk portion 3b of the cocking and driving lever 3 carrying the driving pin 10 first toward and then away from a dead center position, considering the pivot 4 of the disk and the pin 12 of the blade ring 13. That is, the driving pin 10 is at the said dead center position when it reaches a straight line passing through the pivot 4 and the blade-ring pin 12. Considering for example Figs. 2 and 11, wherein the lever 3 and disk 3b are in cocked position, release of the disk by clockwise turning movement of the lever 6 will result in the disk 3b being driven clockwise, whereupon the driving pin 10 will follow a circular path, approaching the mentioned straight line which may be drawn through the pivot 4 and the pin 12 of the blade ring 13. When the driving pin 10 reaches such straight line, the link 11 will have driven the shutter blade ring 13 the maximum distance in a clockwise direction. The driving pin 10 now continues on its circular path, leaving the said hypothetical straight line and traveling downward and to the left, as viewed in Figs. 2 and 11, always about the pivot 4 as a center. This action will now shift the link 11 from right to left, causing the link to reverse the movement of the shutter blade ring 13 whereby the latter has counterclockwise movement, effecting a closing of the shutter blades. The previous clockwise movement of the blade ring 13, of course, effected the opening of the blades, as will be understood.

In accordance with the above organization I reliably maintain the delayed action device uncoupled for the settings "X" and "M" of the setting ring 21, and also reliably effect, for the setting "V" of the ring 21, an uncoupling of the delayed action device during the cocking of the shutter and said device. Therefore the force required to accomplish such cocking is held at a very low value. Moreover, I provide for an effective coupling of the two groups of the delayed action device after release of the shutter driving mechanism and again uncouple such groups prior to the shutter driving mechanism coming to rest. It is important in effecting the above result that a simple mechanism be provided as herein disclosed, to prevent faulty operation and to provide for the utmost reliability of action. The invention has utility in connection not only with delayed action devices wherein one group serves as a synchro device for flash synchronization, but also in connection with other types of delayed action devices where there is encountered an appreciable drag or resistance during the cocking of the device.

Variations and modifications may be made within the

I claim:

1. A photographic intra-lens shutter mechanism having a shutter, a shutter-blade ring, and having a delayed-action device constituted of two groups of mechanically operable mechanisms for effecting a delayed action of the shutter when said groups are coupled, said groups being adapted to be coupled and uncoupled, and being normally uncoupled when the shutter is at rest; means responsive to release of the shutter, for causing coupling of said groups prior to opening of the shutter, thereby to delay the opening thereof said means including a driving member actuated by the shutter-blade ring, and said means causing uncoupling of the said groups after reclosing of the shutter following the delayed opening thereof and prior to halting of said shutter ring in its shutter-closing movement.

2. The invention as defined in claim 1 in which there is a shutter-blade driving mechanism having a movable trip member actuated during operation of the shutter blades, in which there is means for releasing the delayed action device for running-down movement in response to actuation of said trip member, in which there is a spring means normally tending to hold the two said groups of the delayed action device coupled, and in which the said driving member in the rest position of the shutter maintains the said groups uncoupled against the action of said spring means.

3. The invention as defined in claim 2 in which the driving member comprises a pin, in which the said means for uncoupling the groups after reclosing of the shutter includes a lever acted on by the spring means and responsive to movement of said pin, in which the delayed action device has a bearing plate carrying said lever, and in which there is a gear constituting a part of one of the groups, carried by said lever.

4. The invention as defined in claim 3 in which there is a second lever constituting a transmission between said driving pin and the first-mentioned lever.

5. The invention as defined in claim 4 in which the second lever is carried by the said bearing plate.

References Cited in the file of this patent

UNITED STATES PATENTS

| | | |
|---|---|---|
| 2,081,727 | Barenyi | May 25, 1937 |
| 2,245,248 | Aulenbacher et al. | June 10, 1941 |
| 2,663,233 | Rentschler | Dec. 22, 1953 |
| 2,710,568 | Braun | June 14, 1955 |
| 2,715,357 | Gebele | Aug. 16, 1955 |
| 2,727,445 | Rentschler | Dec. 20, 1955 |